United States Patent
Kuo

(10) Patent No.: US 10,135,276 B2
(45) Date of Patent: Nov. 20, 2018

(54) DISCHARGING CIRCUIT WITH VOLTAGE DETECTION THAT SELECTIVELY COUPLES SECOND NODE TO GROUND

(71) Applicant: Quanta Computer Inc., Kuei Shan Hsiang, Tao Yuan Shien (TW)

(72) Inventor: Hsin-Chih Kuo, Tao Yuan Shien (TW)

(73) Assignee: QUANTA COMPUTER INC., Guishan Dist., Taoyuan (TW)

(*) Notice: Subject to any disclaimer, the term of this patent is extended or adjusted under 35 U.S.C. 154(b) by 334 days.

(21) Appl. No.: 14/542,988

(22) Filed: Nov. 17, 2014

(65) Prior Publication Data
US 2016/0111909 A1    Apr. 21, 2016

(30) Foreign Application Priority Data

Oct. 21, 2014 (TW) .............................. 103136244 A

(51) Int. Cl.
*H02J 7/00*    (2006.01)
*H03K 17/28*   (2006.01)
*H02J 7/34*    (2006.01)

(52) U.S. Cl.
CPC ............. *H02J 7/0063* (2013.01); *H02J 7/345* (2013.01); *H02J 2007/0067* (2013.01)

(58) Field of Classification Search
CPC .......... H02J 7/0016; H02J 7/345; H02M 3/07; H02M 3/33507; Y02E 60/13; H05B 39/09;
(Continued)

(56) References Cited

U.S. PATENT DOCUMENTS 5,343,138 A * 8/1994 Ainsworth ............ H02J 7/0073
                                                 320/132
5,345,162 A * 9/1994 Shiojima ............... H02J 7/0081
                                                 320/164
(Continued)

FOREIGN PATENT DOCUMENTS

CN    10108019 A     8/2007
CN    102263516 A1   11/2011
CN    203871902 U    10/2014

OTHER PUBLICATIONS

CN Office Action dated Oct. 19, 2017 in Chinese application (No. 201410616637.3).

(Continued)

*Primary Examiner* — Yalkew Fantu
*Assistant Examiner* — Mohammed J Sharief
(74) *Attorney, Agent, or Firm* — McClure, Qualey & Rodack, LLP

(57) ABSTRACT

A discharging circuit discharging electrical charges of an external energy storage device coupled to a power transmission line coupled between a power supply device and a load is provided. The discharging circuit includes a current-limiting unit, an internal energy storage unit, a voltage detection unit and a discharge unit. The current-limiting unit is coupled between the power transmission line and a first node. The internal energy storage unit is coupled between the first node and a ground node. The ground node receives a ground level. The voltage detection unit detects a level of the first node. The discharge unit is coupled between the power transmission line and a second node. When the level of the first node is less than a pre-determined level, the voltage detection unit directs the second node to couple to the ground node.

11 Claims, 3 Drawing Sheets

(58) Field of Classification Search
CPC ......... B23K 11/248; B60Q 1/387; E04B 2/22; E04B 2002/0206
USPC .......................................... 320/166; 327/401
See application file for complete search history.

(56) References Cited

U.S. PATENT DOCUMENTS

| | | | | |
|---|---|---|---|---|
| 2002/0163825 | A1* | 11/2002 | Regev | G11C 15/04 365/49.1 |
| 2003/0052657 | A1* | 3/2003 | Koernle | G05F 3/18 323/282 |
| 2003/0191504 | A1* | 10/2003 | Meadows | A61N 1/36071 607/33 |
| 2006/0176020 | A1* | 8/2006 | Ibrahim | H02J 7/0063 320/127 |
| 2011/0043225 | A1* | 2/2011 | Sullivan | A61B 5/04004 324/658 |
| 2011/0062919 | A1* | 3/2011 | Hung | H02M 1/4208 320/166 |
| 2012/0218023 | A1* | 8/2012 | Trock | H03K 17/22 327/401 |
| 2013/0021021 | A1* | 1/2013 | Ramirez | G01R 22/061 324/142 |
| 2014/0063593 | A1* | 3/2014 | Berendt | H01S 5/0428 359/341.1 |
| 2014/0111015 | A1* | 4/2014 | Fall | H01L 31/02021 307/66 |

OTHER PUBLICATIONS

Chinese language office action dated Apr. 24, 2018, issued in application No. CN 201410616637.3.

* cited by examiner

DISCHARGING CIRCUIT WITH VOLTAGE DETECTION THAT SELECTIVELY COUPLES SECOND NODE TO GROUND

CROSS REFERENCE TO RELATED APPLICATIONS

This Application claims priority of Taiwan Patent Application No. 103136244, filed on Oct 21, 2014, the entirety of which is incorporated by reference herein.

BACKGROUND OF THE INVENTION

1. Field of the Invention

The invention relates to an electronic circuit, and more particularly to a discharging circuit to the release electrical charges of an external energy storage device.

2. Description of the Related Art

With the development of technology, the functions and types of electronic products have increased. In order to be portable, electronic products generally have batteries to provide power to their electronic elements. Generally, when a battery is removed, the electronic product immediately stops working. However, every electronic product has various capacitors to store electrical charges so that some elements do not stop working

BRIEF SUMMARY OF THE INVENTION

In accordance with an embodiment, a discharging circuit discharges electrical charges of an external energy storage device coupled to a power transmission line coupled between a power supply device and a load. The discharging circuit comprises a current-limiting unit, an internal energy storage unit, a voltage detection unit and a discharge unit. The current-limiting unit is coupled between the power transmission line and a first node. The internal energy storage unit is coupled between the first node and a ground node. The ground node receives a ground level. The voltage detection unit detects a level of the first node. The discharge unit is coupled between the power transmission line and a second node. When the level of the first node is less than a pre-determined level, the voltage detection unit directs the second node to couple to the ground node.

A detailed description is given in the following embodiments with reference to the accompanying drawings.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
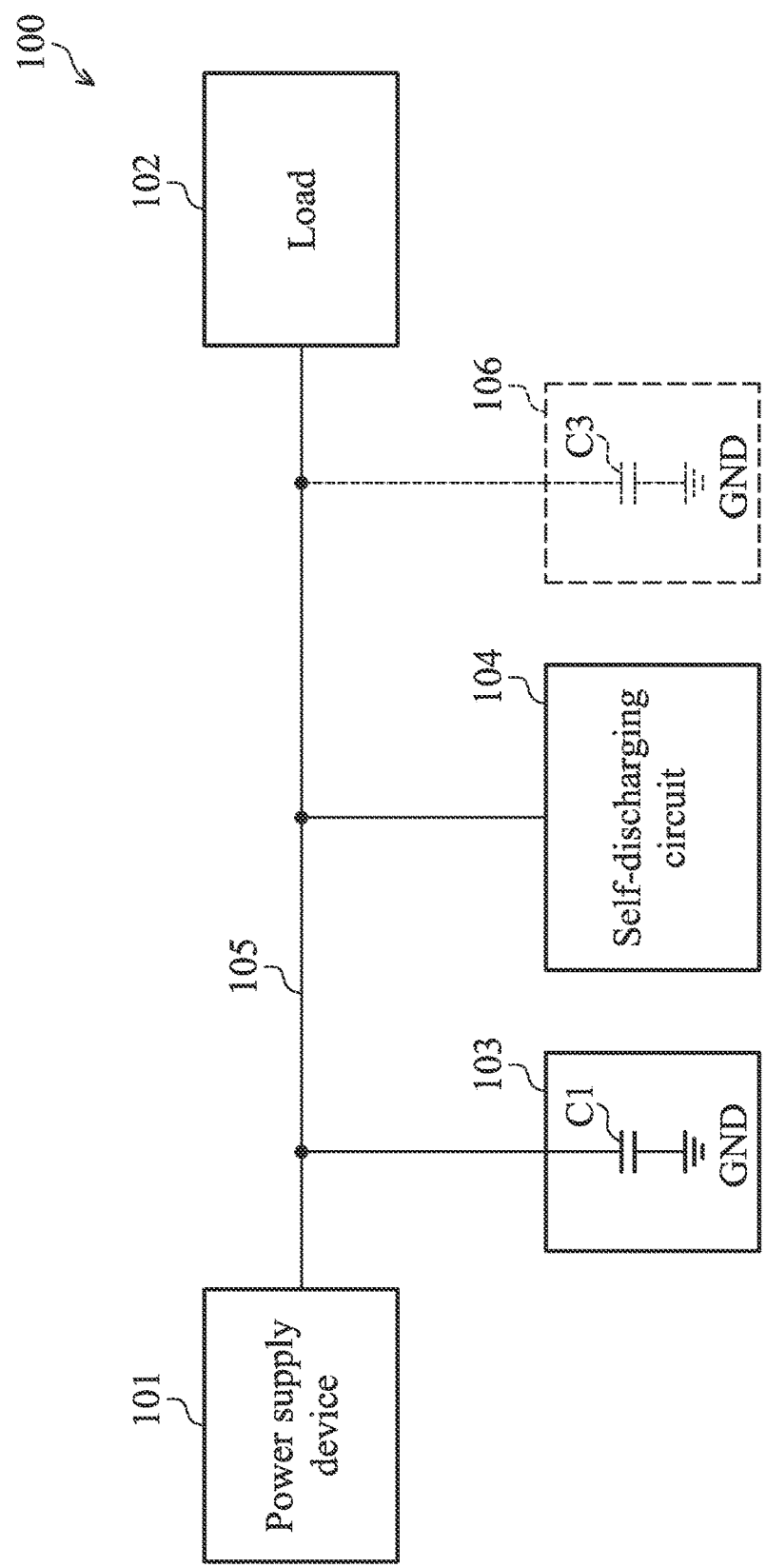
FIG. 1 is a schematic diagram of an operating system according to an embodiment of the present invention.

FIG. 1 is a schematic diagram of an operating system according to an embodiment of the present invention. The operating system 100 comprises a power supply device 101, a load 102, an external energy storage device 103, a discharging circuit 104 and a power transmission line 105. The power supply device 101 provides power to the load 102 via the power transmission line 105.

The invention does not limit the kind of power supply device 101. Any device can serve as a power supply device, as long as the device is capable of providing power. In one embodiment, the power supply device 101 is a battery. The invention does not limit the kind of load 102. Any device or circuit can serve as the load 102, as long as the device or the circuit needs power. In one embodiment, the load 102 is a real-time clock (RTC).

The external energy storage device 103 is coupled between the power transmission line 105 and a ground node GND. In one embodiment, the external energy storage device 103 is the capacitor C1. In another embodiment, the capacitance of the capacitor C1 is greater than 1 uF. In some embodiments, the operating system 100 further comprises another external energy storage device 106. In one embodiment, the external energy storage device 106 is the capacitor C3. Since the external energy storage devices 103 and 106 have the same principle, description of the external energy storage device 106 is omitted for brevity. For clarity, only the external energy storage device 103 is described.

In one embodiment, when the power supply device 101 outputs power to the load 102 via the power transmission line 105, the external energy storage device 103 is also charged. However, when the power supply device 101 stops outputting power to the load 102, since the external energy storage device 103 stores electrical charges, the external energy storage device 103 can transmit power to the load 102 via the power transmission line 105. In some embodiments, when a user removes the power supply device 101 or the power of the power supply device 101 is not enough, the power supply device 101 stops outputting power to the load 102.

When the power supply device 101 stops outputting power to the load 102, the load 102 stops working. However, if the load 102 still works, the user may be unsure whether the power supply device 101 has been removed. Therefore, in this embodiment, the discharging circuit 104 discharges the electrical charge stored in the external energy storage device 103 to speedily drop the voltage of the external energy storage device 103 to 0V. For example, when the level of the power transmission line 105 is less than a pre-determined level, the discharging circuit 104 automatically discharges the remaining electrical charge of the power transmission line 105.

Figure 2:
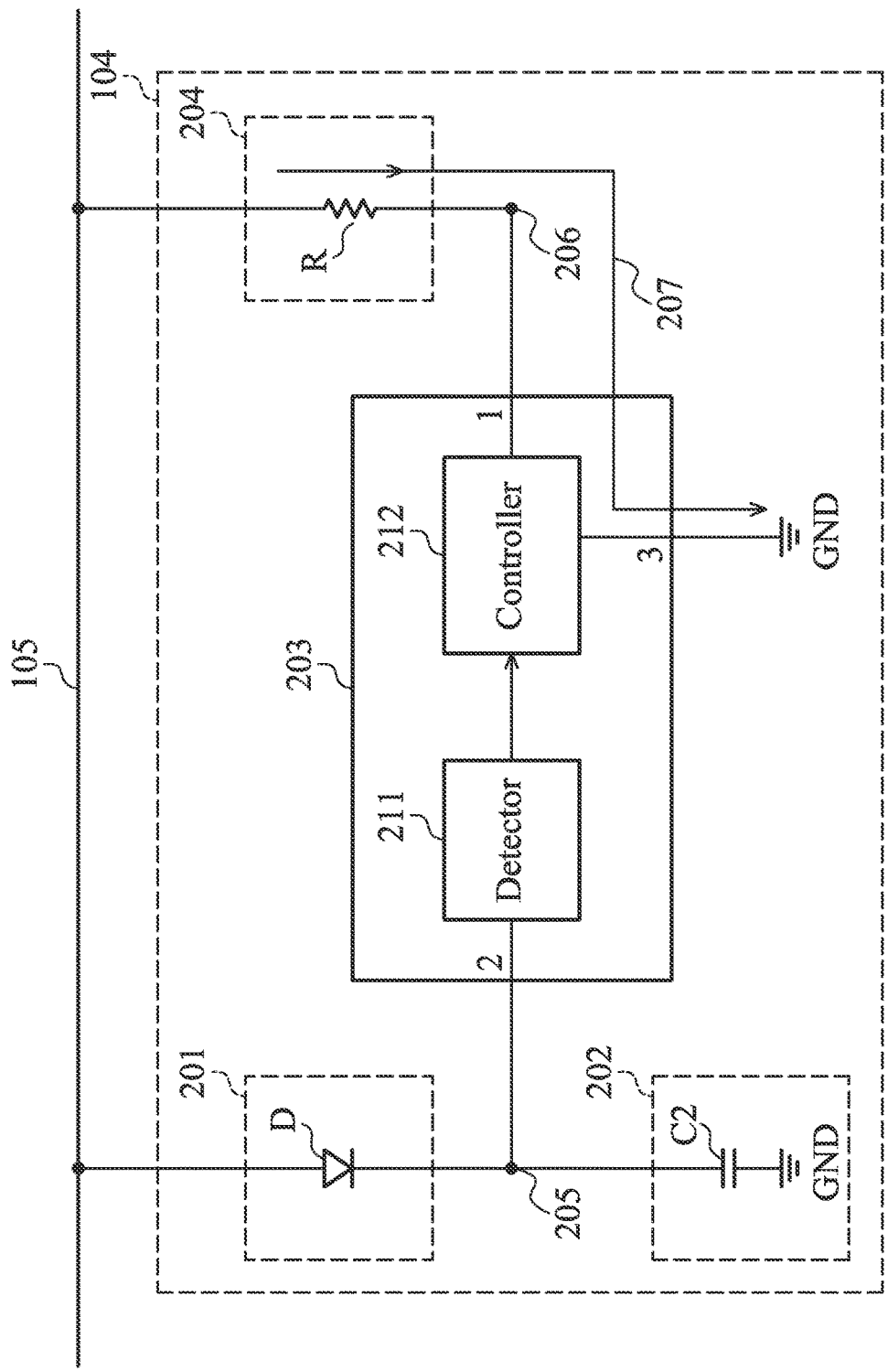
FIG. 2 is a schematic diagram of a discharging circuit according to an embodiment of the present invention.

FIG. 2 is a schematic diagram of a discharging circuit according to an embodiment of the present invention. The discharging circuit 104 comprises a current-limiting unit 201, an internal energy storage unit 202, a voltage detection unit 203 and a discharge unit 204.

The current-limiting unit 201 is coupled between the power transmission line 105 and the node 205 to limit the direction of current. The invention does not limit the circuit structure of the current-limiting unit 201. Any circuit structure can serve as the current-limiting unit 201, as long as the circuit structure is capable of limiting the direction of current.

In one embodiment, the current-limiting unit 201 is a diode D. The anode of the diode D is coupled to the power transmission line 105. The cathode of the diode D is coupled to the node 205. When the level of the power transmission line 105 is greater than the level of the node 205, the diode D is turned on to charge the internal energy storage unit 202. In this embodiment, the diode D directs the direction of current so that the current flows into the internal energy storage unit 202 from the power transmission line 105, and the current does not flow into the power transmission line 105 from the internal energy storage unit 202.

The internal energy storage unit 202 is coupled between the node 205 and a ground node GND to store electrical charges. In one embodiment, the ground node GND receives a ground level. In this embodiment, the internal energy storage unit 202 is a capacitor C2. In one embodiment, the capacitance of the capacitor C2 is within 100 nF~200 nF.

The voltage detection unit 203 detects the level of the node 205. In this embodiment, the voltage detection unit 203 comprises pins 1-3. Pin 1 is coupled to the discharge unit 204. Pin 2 is coupled to the node 205. Pin 3 is coupled to the ground node GND. When the level of the node 205 is higher than a pre-determined level, the current-limiting unit 201 is turned on to charge the internal energy storage unit 202. At this time, the voltage detection unit 203 opens the pins 1 and 3. Therefore, an open state occurs between the pins 1 and 3.

However, when the level of the node 205 is less than the pre-determined level, the voltage detection unit 203 closes the pins 1 and 3 to form a discharge path. Therefore, a closed state occurs between the pins 1 and 3. Since the ground node GND receives a ground level, the electrical charge stored in the external energy storage device 103 flows through the power transmission line 105 and the discharge unit 204 to the ground node GND to be released.

The discharge unit 204 is coupled between the power transmission line 105 and the node 206. When the level of the node 205 is less than a pre-determined level, the voltage detection unit 203 directs the node 206 to connect to the ground node GND. Therefore, the discharge unit 204 provides a discharge path 207 to release the electrical charge stored in the external energy storage device 103. In this embodiment, the discharge unit 204 is a resistor R.

In one embodiment, the resistance of the resistor R is within 100Ω-200Ω.

The external energy storage device 103 is discharged via the discharge unit 204 and the voltage of the external energy storage device 103 drops to 0V such that the voltage level of the power transmission line 105 is speedily reduced to avoid the load 102 improperly working. Furthermore, in this embodiment, since the internal energy storage unit 202 provides power to the voltage detection unit 203, the voltage detection unit 203 can prolong the duration of the closed state between the pins 1 and 3.

Conversely, if the power transmission line 105 provides power to the voltage detection unit 203, when the power supply device 101 is removed or stops providing power, the level of the power transmission line 105 is gradually reduced. When the level of the power transmission line 105 is not enough to drive the voltage detection unit 203, the voltage detection unit 203 cannot maintain the closed state between the pins 1 and 3 such that the voltage of the external energy storage device 103 cannot be released to 0V. When the voltage of the external energy storage device 103 cannot be released to 0V, the load 102 may improperly work.

In this embodiment, since the current-limiting unit 201 limits the direction of the current (from the power transmission line 105 to the internal energy storage unit 202), when the discharge path 207 is turned on, the electrical charge stored in the internal energy storage unit 202 cannot be released and does not flow through the discharge unit 204. Additionally, since the voltage detection unit 203 operates according to the electrical charge stored in the internal energy storage unit 202, when the level of the power transmission line 105 is less than a pre-determined level, the voltage detection unit 203 continuously maintains the closed state between the pins 1 and 3 to release the electrical charge of the power transmission line 105.

In this embodiment, the voltage detection unit 203 comprises a detector 211 and a controller 212, but the disclosure is not limited thereto. The invention does not limit the circuit structure of the voltage detection unit 203. Any circuit structure can serve as the voltage detection unit 203, as long as the circuit structure is capable of detecting voltage and providing ground level to the node 206.

The detector 211 detects the level of the node 205. The controller 212 opens or closes the pins 1 and 3 according to the detection result generated by the detector 211. For example, when the level of the node 205 is greater than a pre-determined level, the controller 212 opens the pins 1 and 3. Therefore, the discharge path 207 is turned off. However, when the level of the node 205 is less than the pre-determined level, the controller 212 closes the pins 1 and 3 to turn on the discharge path 207 and release the electrical charge stored in the external energy storage device 103.

The invention does not limit the circuit structures of the detector 211 and the controller 212. Any circuit can serve as the detector 211, as long as the circuit is capable of detecting voltage. Similarly, any circuit structure can serve as the controller 212, as long as the circuit structure is capable of providing a discharge path.

Figure 3:
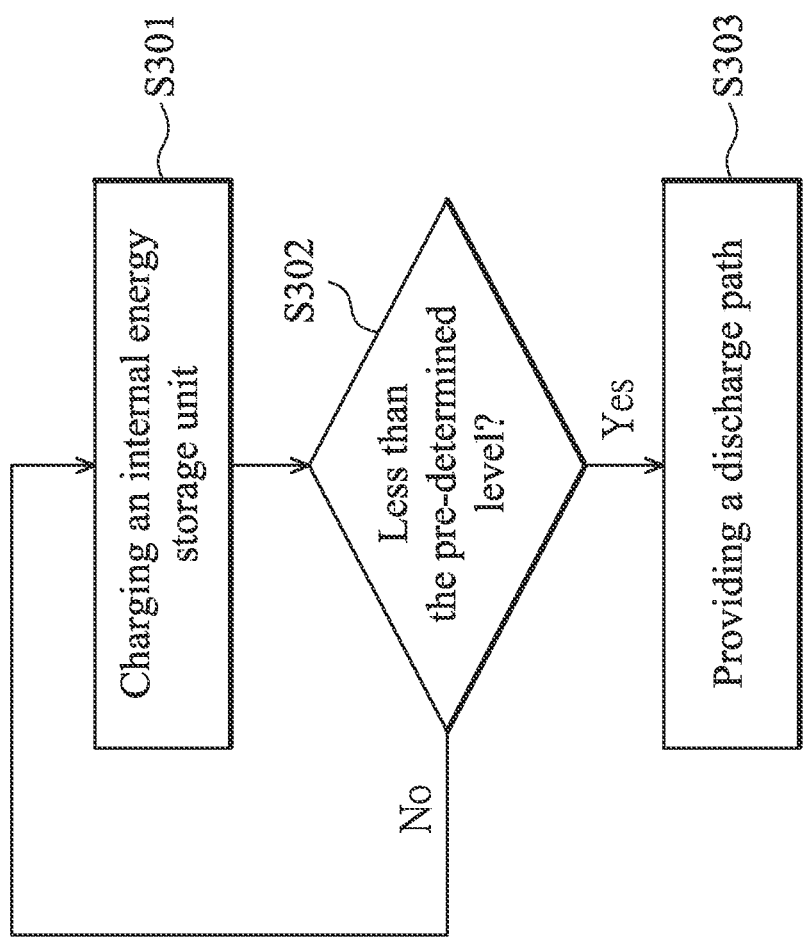
FIG. 3 is a flowchart of a discharging method according to an embodiment of the present invention.

FIG. 3 is a flowchart of a discharging method according to an embodiment of the present invention. The discharging method is applied to release the electrical charge of a power transmission line. In one embodiment, the power transmission line is coupled between a power supply device and a load. The power transmission line transmits power provided by the power supply device to the load. Since an external energy storage device is coupled to the power transmission line, when the power supply device does not provide power, the power transmission line still transmits power stored in the external energy storage device to the load.

To speedily release energy stored in the external energy storage device, the discharging method is used to provide a discharge path when the level of the power transmission line is less than a pre-determined level. First, an internal energy storage unit is charged (step S301). The invention does not limit the kind of internal energy storage unit. In one embodiment, the internal energy storage unit is a capacitor. The capacitance of the capacitor is within approximately 100nF~200nF.

Next, the level of the power transmission line is determined (step S302). Since the power transmission line is coupled to the external energy storage device, the level of the power transmission line is approximately equal to the level of the external energy storage device.

When the level of the power transmission line is greater than a pre-determined level, step S301 is executed to charge the internal energy storage unit until the level of the internal energy storage unit arrives at a maximum value. When the level of the power transmission line is less than the pre-determined level, a discharge path is provided to release the electrical charge of the power transmission line (step S303).

The invention does not limit how a discharge path is provided. In one embodiment, the discharge path is formed by a resistor. The resistor is disposed between the power transmission line and a ground node. The ground node receives a ground level. When the level of the power transmission line is greater than the pre-determined level, the resistor does not connect to the ground node. Therefore, the discharge path is not formed. However, when the level of the power transmission line is less than the pre-determined level, the resistor is connected to connect to the ground node. Therefore, the electrical charge of the power transmission line is released to ground.

In another embodiment, the internal energy storage unit is coupled to a current-limiting unit to avoid releasing the electrical charge of the internal energy storage unit. Therefore, while releasing the electrical charge of the power transmission line, the electrical charge of the internal energy storage unit does not flow through the discharge path.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A discharging circuit discharging an electrical charge of an external energy storage device coupled to a power transmission line coupled between a power supply device and a load, comprising:
    a current-limiting unit coupled between the power transmission line and a first node, wherein the current-limiting unit is directly connected to the power transmission line and the first node;
    an internal energy storage unit coupled between the first node and a ground node, wherein the ground node receives a ground level;
    a voltage detection unit detecting a level of the first node; and
    a discharge unit coupled between the power transmission line and a second node, wherein when the level of the first node is less than a pre-determined level, the voltage detection unit directs the second node to couple to the ground node,
    wherein when a level of the power transmission line is greater than the level of the first node, the internal energy storage unit is charged, and
    wherein responsive to the power supply device providing power to the load, no current passes through the current-limiting unit from the internal energy storage unit to the power transmission line.

2. The discharging circuit as claimed in claim 1, wherein when the level of the first node is greater than the pre-determined level, the current-limiting unit is turned on to charge the internal energy storage unit.

3. The discharging circuit as claimed in claim 1, wherein the current-limiting unit is a diode.

4. The discharging circuit as claimed in claim 3, wherein an anode of the diode is coupled to the power transmission line, and a cathode of the diode is coupled to the first node.

5. The discharging circuit as claimed in claim 1, wherein the discharge unit is a resistor.

6. The discharging circuit as claimed in claim 1, wherein the load is a real time clock (RTC).

7. The discharging circuit as claimed in claim 1, wherein the internal energy storage unit is a capacitor.

8. The discharging circuit as claimed in claim 7, wherein a capacitance of the capacitor is within 100 nF~200 nF.

9. The discharging circuit as claimed in claim 1, wherein when the second node is directed to couple to the ground node, the discharge unit discharges the external energy storage device such that a voltage stored in the external energy storage device is 0V.

10. The discharging circuit as claimed in claim 1, wherein the external energy storage device is a capacitor, and a capacitance of the capacitor is greater than 1 µF.

11. The discharging circuit as claimed in claim 1, wherein when the power supply device is removed or stops providing power to the power transmission line, the level of the power transmission line is reduced such that the level of the first node is reduced.

* * * * *